United States Patent
Kato et al.

(10) Patent No.: US 7,267,332 B2
(45) Date of Patent: Sep. 11, 2007

(54) HYDRAULIC VIBRATION ISOLATION DEVICE

(75) Inventors: Akihiko Kato, Osaka (JP); Masayuki Toi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 89 days.

(21) Appl. No.: 11/222,974

(22) Filed: Sep. 12, 2005

(65) Prior Publication Data

US 2006/0119025 A1 Jun. 8, 2006

(30) Foreign Application Priority Data

Dec. 6, 2004 (JP) .................. PCT/JP2004/018133
Jun. 7, 2005 (JP) .............................. 2005-167567

(51) Int. Cl.
F16F 5/00 (2006.01)
F16F 9/00 (2006.01)
F16F 13/00 (2006.01)
F16F 15/00 (2006.01)
F16M 5/00 (2006.01)

(52) U.S. Cl. .............................. 267/140.12; 267/141.6
(58) Field of Classification Search .......... 267/140.11, 267/140.12, 141.6
See application file for complete search history.

(56) References Cited

U.S. PATENT DOCUMENTS

| 5,118,087 | A * | 6/1992 | Jordens et al. ......... 267/140.12 |
| 5,657,510 | A * | 8/1997 | Satori et al. .................. 16/2.2 |
| 5,887,844 | A * | 3/1999 | Fujiwara et al. ....... 267/140.12 |
| 6,352,246 | B2 * | 3/2002 | Katagiri ................. 267/140.11 |
| 6,364,298 | B1 * | 4/2002 | Vossel et al. ............... 267/293 |
| 2003/0042089 | A1 | 3/2003 | Tamura et al. |
| 2005/0035507 | A1 * | 2/2005 | de Fontenay et al. ... 267/140.12 |
| 2006/0119025 | A1 * | 6/2006 | Kato et al. ............. 267/140.12 |

FOREIGN PATENT DOCUMENTS

JP 34-8017 5/1959
JP 45-18 1/1970

(Continued)

*Primary Examiner*—Devon Kramer
(74) *Attorney, Agent, or Firm*—Westerman, Hattori, Daniels & Adrian, LLP.

(57) ABSTRACT

A hydraulic vibration isolator with sub-orifices having each rubber valve is provided, such that is aimed at ensuring a sufficient orifice length for a main orifice (22). An intermediate cylinder (32) disposed between an inner and an outer cylinders (12, 14) is comprised of fitting peripheral walls (34, 36) at both ends and joining walls (38, 40) between them; a first and a second liquid chambers (18, 20) are delimited by a vibration-isolating base body (16) interconnecting the joining walls and the inner cylinder; the fitting peripheral walls and the inner cylinder are interconnected by end walls (42) of rubber-like elastomer, and orifice-forming parts (44, 46) are provided on the outer surface sides of the joining walls. At the orifice-forming parts, a channel (50) having a first rubber valve (24) forming a first sub-orifice (26), a channel (56) having a second rubber valve (28) forming a second sub-orifice (30), and fitting recessed portions (48, 54) are provided. In the first and second liquid chambers, main orifice-forming members (60, 70) having respective channels (64, 74) on their outer peripheral surfaces are disposed, and fitting protrusions (66, 68, 76, 78) on both ends thereof are fitted in the fitting recessed portions, whereby the main orifice through which both liquid chambers communicate is formed.

5 Claims, 10 Drawing Sheets

FOREIGN PATENT DOCUMENTS

| | | |
|---|---|---|
| JP | 47-20288 | 6/1972 |
| JP | 59-175757 | 11/1984 |
| JP | 07-42460 | 8/1995 |
| JP | 2003-083389 A | 3/2003 |
| JP | 2003-184941 A | 7/2003 |
| WO | WO 03/033936 A1 | 4/2003 |

* cited by examiner

HYDRAULIC VIBRATION ISOLATION DEVICE

BACKGROUND OF THE INVENTION

1. Field of the Invention

This invention relates to a hydraulic vibration isolation device and more particularly, to such a hydraulic vibration isolation device that abrupt hydraulic pressure fluctuation between two liquid chambers can be alleviated by flowing the liquid through by opening and dosing of orifices each equipped with a rubber valve.

2. Description of the Related Art

For a hydraulic vibration isolation device of this type, WO 03/033936 A1 discloses the one which comprises an inner cylinder, an outer cylinder, a vibration-isolating base body made of rubber-like elastomer interposed between both cylinders, an intermediate cylinder, a first liquid chamber and a second liquid chamber provided to interpose the inner cylinder on both sides thereof, a main orifice bringing both liquid chambers into communication with each other, a first sub-orifice for flowing the liquid only from the first liquid chamber to the second liquid chamber through a first rubber valve, and a second sub-orifice for flowing the liquid only from the second liquid chamber to the first liquid chamber through a second rubber valve, wherein the intermediate cylinder includes a pair of ring-like fitting peripheral walls on axially both ends thereof to which the outer cylinder is fitted, and a pair of joining walls situated to interpose the center axis of the intermediate cylinder and joining the pair of fitting peripheral walls, and the first sub-orifice and the second sub-orifice are formed on sides of outer peripheral surfaces of the joining walls.

In this hydraulic vibration isolation device, when the hydraulic pressure difference between the first liquid chamber and the second liquid chamber is below a preset value, the first rubber valve and the second rubber valve retain a dosing state and the liquid fluidizes within the main orifice, by fluidization action of which a damping force is exhibited and vibration is absorbed. On the other hand, when the hydraulic pressure difference reaches the preset value and for instance, the hydraulic pressure on the first liquid chamber side is higher, the first rubber valve is resiliently deformed to open owing to the hydraulic pressure and the liquid flows through the second sub-orifice from the second liquid chamber to the first liquid chamber. Thereby the hydraulic pressure of the second liquid chamber is depressed and durability of the rubber wall forming the second liquid chamber is prevented from lowering.

Heretofore the aforesaid main orifice has been configured merely by forming an orifice channel in the rubber portion provided on each of the outer peripheral face sides of the joining walls and covering the orifice channel with the outer cylinder.

According to the conventional configuration described above, because the main orifice was provided on the outer peripheral face sides of the joining walls of the intermediate cylinder, it was difficult to ensure a sufficient orifice length accommodated to the vibration isolating characteristics as required. In particular, with the above-mentioned vibration isolating device, the first sub-orifice and the second sub-orifice as well as the main orifice were formed on the outer peripheral surfaces of the joining walls and consequently, it was unable to ensure a sufficient space to form the main orifice.

SUMMARY OF THE INVENTION

In view of the issues described above, this invention has been made and it is an object of the invention to provide a hydraulic vibration isolation device provided with sub-orifices having rubber valves such that is capable of ensuring a sufficient orifice length for the main orifice.

The hydraulic vibration isolation device pertaining to this invention comprises an inner cylinder, an outer cylinder surrounding the inner cylinder axially parallel to the inner cylinder, a vibration-isolating base body made of rubber-like elastomer interposed between the inner cylinder and the outer cylinder, an intermediate cylinder disposed between the inner cylinder and the outer cylinder, a first liquid chamber and a second liquid chamber disposed interposing the inner cylinder between them, a main orifice bringing the first liquid chamber and the second liquid chamber into communication with each other, a first sub-orifice flowing the liquid through a first rubber valve only from the first liquid chamber to the second liquid chamber, and a second sub-orifice flowing the liquid through a second rubber valve only from the second liquid chamber to the first liquid chamber. And the intermediate cylinder includes a pair of ring-like fitting peripheral walls at axially both ends thereof, to which the outer cylinder is fitted, and a pair of joining walls interposing the inner cylinder between them and disposed radially inwardly of the fitting peripheral walls to join the pair of the fitting peripheral walls together; the vibration-isolating base body connects inner surfaces of the pair of joining walls and outer peripheral surface of the inner cylinder opposed to the inner surfaces thereby to delimit the first liquid chamber and the second liquid chamber in the circumferential direction; end walls made of rubber-like elastomer are provided between the pair of fitting peripheral walls and the inner cylinder to form chamber walls of the first liquid chamber and the second liquid chamber at axial ends thereof. Further a first orifice-forming part making pressure contact with the inner peripheral surface of the outer cylinder is provided on a side of an outer surface of the one joining wall while a second orifice-forming part in pressure contact with the inner peripheral surface of the outer cylinder is provided on a side of an outer surface of the other joining wall. Of the first orifice-forming part and the second orifice-forming part, in at least the one, a first sub-orifice channel extending circumferentially is provided, whereby the first sub-orifice is formed between the first sub-orifice channel and the inner peripheral surface of the outer cylinder. On the other hand, a second sub-orifice channel extending circumferentially is provided in at least the one of the first orifice-forming part and the second orifice-forming part, and the second sub-orifice is formed between the second sub-orifice channel and the inner peripheral surface of the outer cylinder. Further, the first orifice-forming part and the second orifice-forming part are provided with respective fitting recessed portions extending circumferentially; a first main orifice-forming member provided on its outer peripheral surface with a first main orifice channel communicating with the first liquid chamber through a first opening is disposed within the first liquid chamber, a second main orifice-forming member provided on its outer peripheral surface with a second main orifice channel communicating with the second liquid chamber through a second opening is disposed within the second liquid chamber, these first and second main orifice-forming members are provided at both circumferential ends thereof with fitting protrusions, and the fitting protrusions are fitted in the fitting recessed portions thereby being disposed to be spanned between the first orifice-forming part and the second orifice-forming part in the respective liquid chambers; outer peripheral surfaces of the first and the second main orifice-forming members are brought in pressure contact with the inner peripheral surface of the outer cylinder, and the first main orifice channel and the second main orifice channel are made to communicate and join with each other in the first orifice-forming part thereby to form the main orifice.

According to this construction, because the first main orifice-forming member and the second main orifice-forming member are constructed so that the first liquid chamber and the second liquid chamber are mounted inside, respectively, so as to form the main orifice by these main orifice-forming members, it is possible to ensure a sufficient orifice length for the main orifice and to exhibit effectively the liquid fluidization action through the main orifice. Further because these main orifice-forming members are disposed in the respective liquid chambers by fitting the fitting protrusions at both ends thereof into the fitting recessed portions provided at the first and second orifice-forming parts on the outer surface sides of the joining walls, the assembling work is easy, as well.

In this invention, an inner stopper protruding radially outwardly from a side of the inner cylinder may be provided within each of the first and the second liquid chambers, and the first and the second main orifice-forming members may be provided with an outer stopper protruding radially inwardly opposite to the inner stopper.

In cases where stopper means limiting relative displacements of the inner and outer cylinders within a predetermined range is provided, the stopper means might be constituted singly of a stopper protruding radially outwardly of the inner cylinder, as is the case with the above-identified patent document. However, in that case where the stopper means is constituted only of the stopper from the inner cylinder side, there is a danger in that upon displacement in a prying direction such that the center axis of the outer cylinder tilts relative to the center axis of the inner cylinder, the stopper comes into contact with the end walls to cause a rupture. On the contrary, by dividing the stopper means into the inner stopper from the inner cylinder and the outer stopper from the first and the second main orifice-forming members in the manner as described above, such rupture of the end walls upon displacement in the prying direction can be prevented. That is, according to the invention, the members for forming the main orifice can be made to act as a stopper too, whereby it is possible to ensure the orifice length for the main orifice and to prevent breakage of the end walls by the stopper means without increasing the parts number.

In the invention, the hydraulic vibration isolating device may be constructed as follows: the first sub-orifice channel is provided with the first rubber valve in the form of a rubber membrane, and the first rubber valve is configured with its top being in pressure contact with the inner peripheral surface of the outer cylinder and formed in a slanting posture such that the top is located downstream of the first sub-orifice; the second sub-orifice channel is provided with the second rubber valve in the form of a rubber membrane, and the second rubber valve is configured with its top being in pressure contact with the inner peripheral surface of the outer cylinder and formed in a slanting posture such that the top is located downstream of the second sub-orifice; the tops of the first rubber valve and the second rubber valve are formed over the entire width thereof with respective bulging portions in an arc form in cross-section that are in pressure contact with the inner peripheral surface of the outer cylinder, wherein the bulging portion of the first rubber valve bulges outwardly of a valve surface on a side corresponding to the upstream side of the first sub-orifice, of a pair of valve surfaces of the first rubber valve, and the bulging portion of the second rubber valve bulges outwardly of a valve surface on a side corresponding to the upstream side of the second sub-orifice, of a pair of valve surfaces of the second rubber valve.

Due to the fact that the bulging portions in an arc form in cross-section making pressure contact with the inner peripheral surface of the outer cylinder are provided on the tops of the first rubber valve and the second rubber valve in this way, when a hydraulic pressure difference between the first liquid chamber and the second liquid chamber reaches a predetermined value, an impetus is given to sway motion of the first rubber valve or the second rubber valve toward its opening side by the bulging portion, and the opening speed of the first rubber valve or the second rubber valve becomes rapid, for example, as compared with the structure that the first rubber valve and the second rubber valve are formed in a simple rubber membrane having a constant wall thickness. Thereby it is possible to expedite the lowering of the hydraulic pressure difference between both liquid chambers to a desired value.

In the present invention, the first orifice-forming part may be provided in its axially central part with the fitting recessed portion, at least on one side of both sides of which the first sub-orifice channel is provided, and a rubber seal lip that joins with widthwise one end of the bulging portion of the first rubber valve provided in the first sub-orifice channel and with a lateral portion of an annular seal lip made of rubber extending in the circumferential direction and provided on the outer peripheral surface of the fitting periphery wall may be formed on the outer peripheral surface of the first orifice-forming part. Further, the second orifice-forming part may be provided in an axially central part with the fitting recessed portion, at least on one side of both sides of which the second sub-orifice channel is provided, and a rubber seal lip that joins with widthwise one end of the bulging portion of the second rubber valve provided in the second sub-orifice channel and with a lateral part of the annular seal lip made of rubber extending in the circumferential direction and provided on the outer peripheral surface of the fitting periphery wall may be formed on the outer peripheral face of the second orifice-forming part.

More specifically, the first orifice-forming part may be provided in its axially central part with the fitting recessed portion, on both sides of which the first orifice channel is provided, and the rubber-made seal lip joining with the widthwise one end of the bulging portion of the first rubber valve provided in the first sub-orifice and with the lateral portion of the rubber-made annular seal lip provided on the one fitting periphery wall and extending in the circumferential direction may be provided on the outer peripheral surface of the first orifice-forming part; and the rubber-made seal lip joining with widthwise the other end of the bulging portion of the first rubber valve provided in the first sub-orifice and with the lateral portion of the rubber-made annular seal lip provided on the other fitting periphery wall and extending in the circumferential direction may be provided on the outer peripheral surface of the first orifice-forming part. Further, the second orifice-forming part may be provided in its axially central part with the fitting recessed portion, on both sides of which the second orifice channel is provided, and the rubber-made seal lip joining with widthwise the one end of the bulging portion of the second rubber valve provided in the second sub-orifice and with the lateral portion of the rubber-made annular seal lip provided on the one fitting periphery wall and extending in the circumferential direction may be provided on the outer peripheral surface of the second orifice-forming part; and the rubber-made seal lip joining with widthwise the other end of the bulging portion of the second rubber valve provided in the second sub-orifice and with the lateral portion of the rubber-made annular seal lip provided on the other fitting periphery wall and extending in the circumferential direction may be provided on the outer peripheral surface of the second orifice-forming part.

By adopting such a construction as this, it is possible to prevent the liquid from flowing out widthwise outwardly of the first rubber valve or the second rubber valve between the outer peripheral surface of the first orifice-forming part or the second orifice-forming part and the inner peripheral surface of the outer cylinder. And when the first rubber valve or the second rubber valve is dosed, the annular seal lip and the seal lip joining with it can inhibit the trouble that the liquid flows widthways outwardly of the first rubber valve or the second rubber valve in the direction extending along the first sub-orifice or the second sub-orifice between the outer peripheral surface of the first orifice-forming part or the second orifice-forming part and the inner peripheral surface of the outer cylinder and can avoid the trouble that the first sub-orifice part and the second sub-orifice part on both sides of the first rubber valve and the second rubber valve run into communication state.

According to the hydraulic vibration isolation device of the invention as described above, it is possible to ensure a sufficient orifice length for the main orifice as a hydraulic vibration isolation device having the sub-orifices provided with the rubber valves.

DESCRIPTION OF THE PREFERRED EMBODIMENTS

Preferred embodiments of the invention will be hereinafter described with reference to the accompanying drawings.

Figure 16:
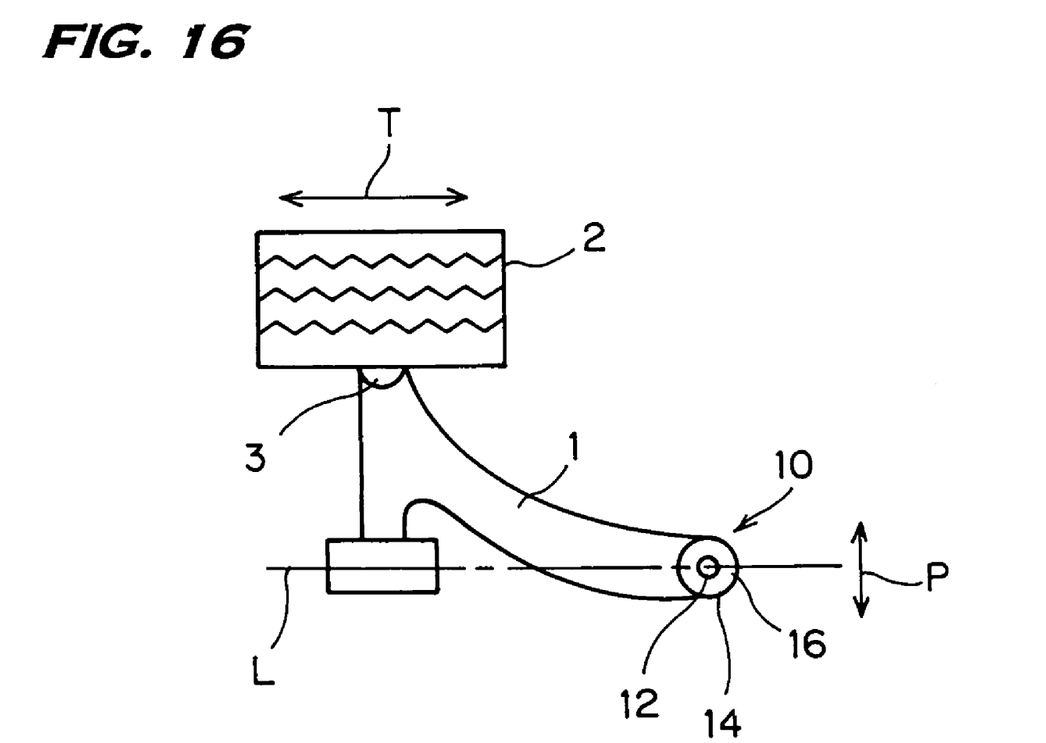
FIG. 16 is a schematic view showing the state of the hydraulic vibration isolation device above installed on a vehicle.

FIGS. 1 through 6 show a hydraulic vibration isolation device 10 relating to one embodiment of the invention. This hydraulic vibration isolation device 10 is a bushing type vibration isolator interconnecting a lower link 1 of a front wheel suspension of an automobile and a vehicle body frame as illustrated in FIG. 16. In FIG. 16, the reference numeral 16 designates a fire, and the reference numeral 3 designates a ball joint.

The hydraulic vibration isolation device 10 includes an inner cylinder 12 in a cylinder form to be connected to the vehicle body frame, an outer cylinder 14 in a cylinder form surrounding coaxially the inner cylinder 12 and to be press fitted in a press fitting hole of the lower link 1, and a vibration-isolating base body 16 made of rubber-like elastomer interposed between the former two.

Between the inner cylinder 12 and the outer cylinder 14, a first liquid chamber 18 and a second liquid chamber 20, whose chamber walls are of the vibration-isolating base body 16, are formed in an opposed manner on both sides interposing the inner cylinder 12. The first liquid chamber 18 and the second liquid chamber 20 communicate through a main orifice 22 with each other. Between the first liquid chamber 18 and the second liquid chamber 20, there are provided a first sub-orifice 26 through which to flow the liquid only from a side of the first liquid chamber 18 to a side of the second liquid chamber 20 through a first rubber valve 24 and a second sub-orifice 30 through which to flow the liquid only from the side of the second liquid chamber 20 to the side of the first liquid chamber 18 through a second rubber valve 28.

Between the inner cylinder 12 and the outer cylinder 14, an intermediate cylinder 32 in a circular form in cross-section surrounding coaxially the inner cylinder 12 is disposed. The intermediate cylinder 32 consists of a pair of ring-like fitting peripheral walls 34, 36 at axially both ends thereof on which the outer cylinder is externally fitted and a pair of joining walls 38, 40 in an arc form in cross-section which are situated interposing the inner cylinder 12 on both sides and radially inwardly of the fitting peripheral walls 34, 36 and join the pair of the fitting peripheral walls 34, 36 together.

Figure 2:
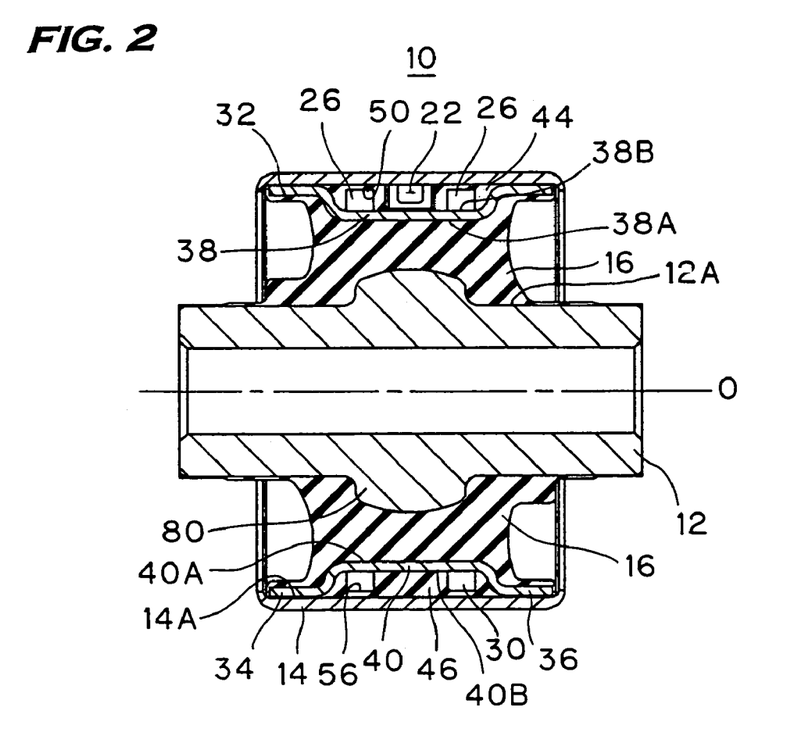
FIG. 2 is a sectional view taken along II-II line of FIG. 1.
Figure 3:
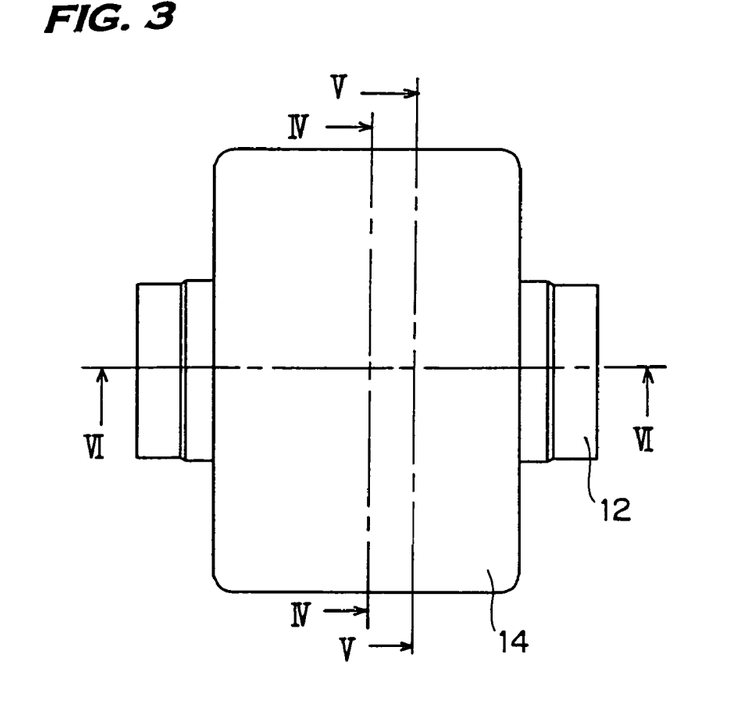
FIG. 3 is a front elevation of the vibration isolation device above.
Figure 5:
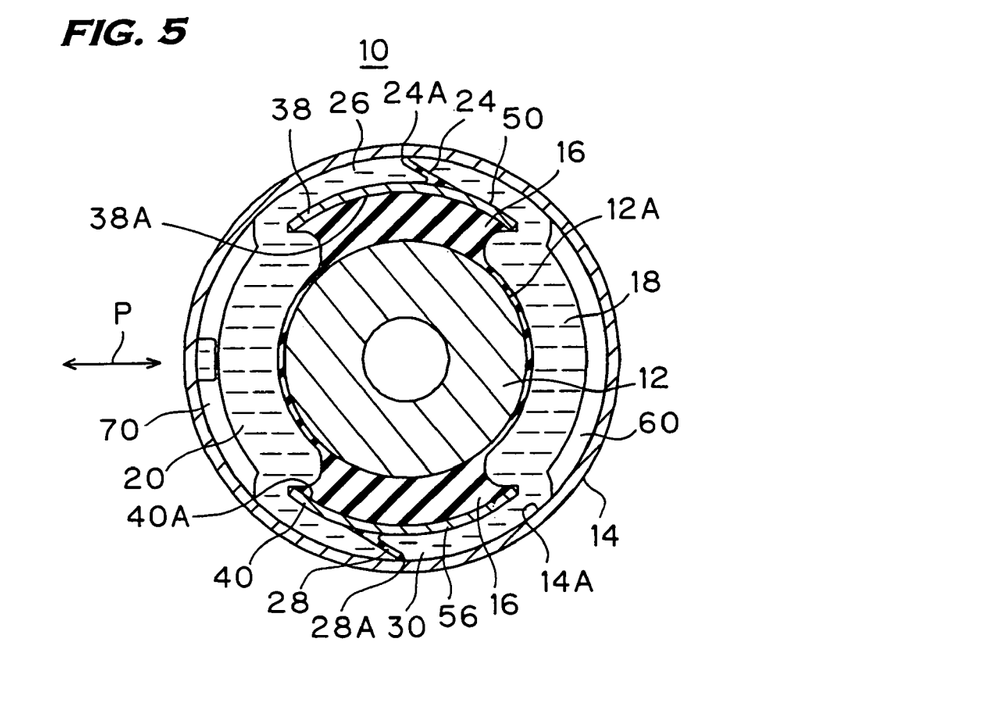
FIG. 5 is a sectional view taken along V-V line in FIG. 3.

As shown in FIGS. 2 and 5, the vibration-isolating base body 16 is vulcanization bonded between the inner surface 38A of the one joining wall, a first joining wall 38 and an outer peripheral surface 12A of the inner cylinder 12 opposed to it and between an inner surface 40A of the other joining wall, a second joining wall 40 and the outer peripheral surface 12A of the inner cylinder 12 facing it, thus constituting a pair of the vibration-isolating base bodies 16, 16 interposing the inner cylinder, whereby the first liquid chamber 18 and the second liquid chamber 20 are delimited by the pair of vibration-isolating base bodies 16, 16 in the circumferential direction.

Figure 1:
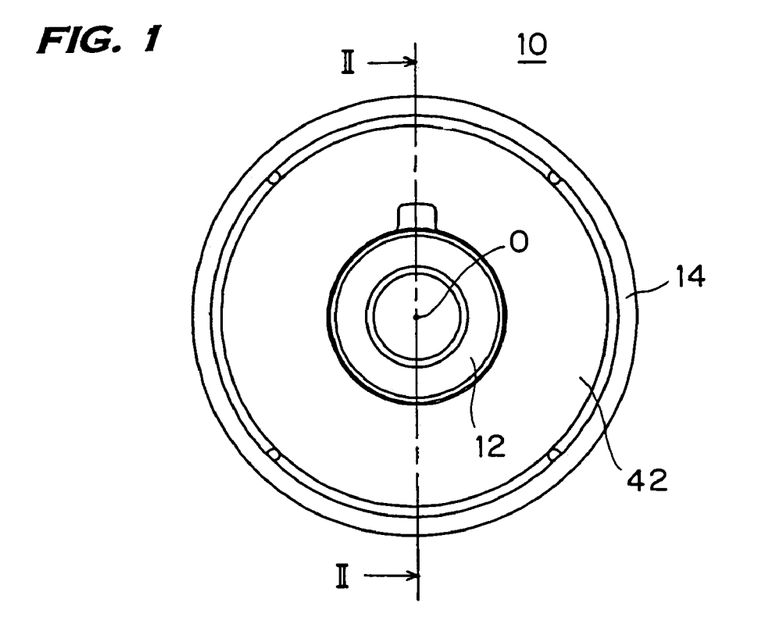
FIG. 1 is a side elevation of a hydraulic vibration isolation device pertaining to one embodiment of the invention.
Figure 6:
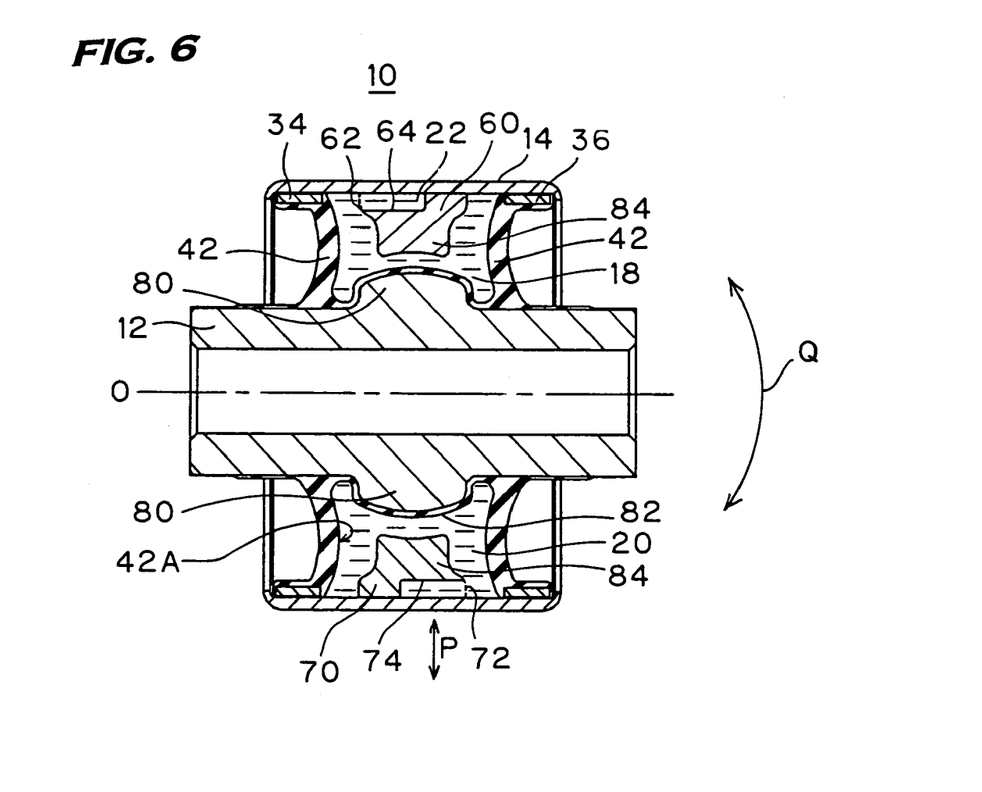
FIG. 6 is a sectional view taken along VI-VI line in FIG. 3.

As illustrated in FIGS. 1 and 6, end walls 42, 42 made of rubber-like elastomer are provided between the one fitting peripheral wall, a first peripheral fitting wall 34 and the inner cylinder 12, and between the other peripheral fitting wall, a second peripheral fitting wall 36 and the inner cylinder 12. The pair of end walls 42, 42 form chamber walls at both axial ends of the first liquid chamber 18 and the second liquid chamber 20. Each of the end walls 42 is configured in an inwardly curved form as depicted in FIG. 6, and more particularly, in such a curved form in cross-section that a central portion 42A in the height direction of the end wall bulges most toward an axial center thereof. Thereby when a load is input in a perpendicular direction P to the axis (orthogonal direction to the center axis O), the end wall 42 of the liquid chamber on the compression side deforms in a manner deflecting inwardly, which makes the change in volume of the liquid chamber on the compression side large, elevating the liquid fluidization action of the main orifice 22.

As shown in FIG. 2, on a side of an outer surface 38B of the first joining wall 38, a first orifice-forming part 44 in pressure contact with an inner peripheral surface 14A of the outer wall 14 is formed by rubber-like elastomer, while on a side of an outer surface 40B of the second joining wall 40, a second orifice-forming part 46 in pressure contact with the inner peripheral surface 14A of the outer cylinder 14 is formed by rubber-like elastomer.

Figure 7:
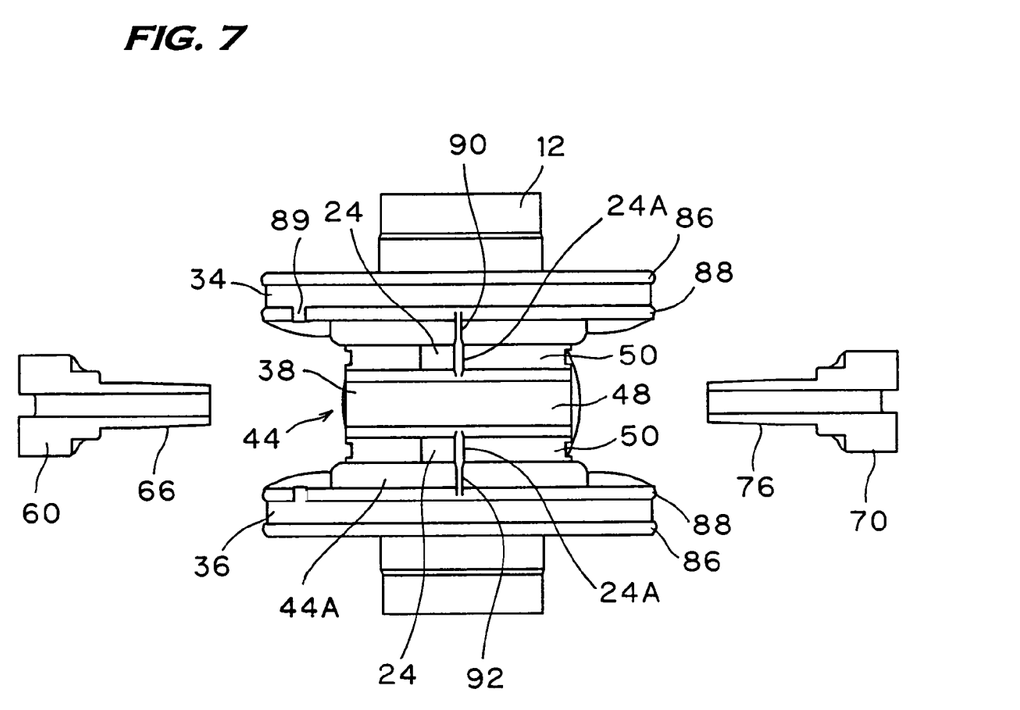
FIG. 7 is a front elevational view showing the state of the vibration isolation device above prior to assembling of main orifice forming members into a rubber molding including an inner cylinder and an intermediate cylinder.
Figure 8:
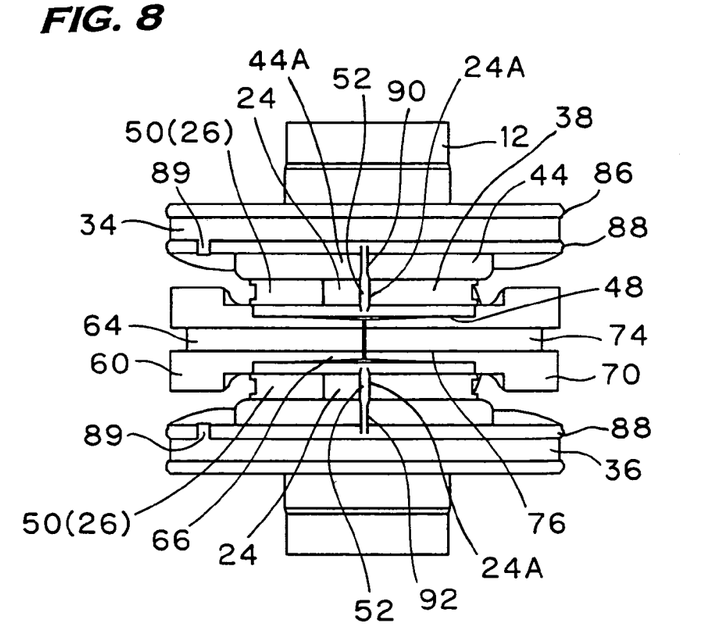
FIG. 8 is a front elevation showing the state after assembling of FIG. 7.

The first orifice-forming part 44 is, as illustrated in FIGS. 7 and 8, provided with a first fitting recessed portion 48 extending circumferentially in an axial central part thereof, on both axial ends of which there are formed a pair of first sub-orifice channels 50, 50 extending in the circumferential direction. The first fitting recessed portion 48 and the pair of first sub-orifice channels 50 assume a U-like form in cross-section opening radially outwardly and are formed over the entire peripheral direction of the first joining wall 38.

The first sub-orifice 26 is formed by bringing the inner peripheral surface 14A of the outer cylinder 14 into pressure contact with the first sub-orifice channel 50. In this embodiment, in the first orifice-forming part 44 two first sub-orifices 26, 26 are provided in parallel. In the pair of the first sub-orifice channels 50, 50 the first rubber valves 24, 24 are vulcanization molded so that each top 24A of the first rubber valve 24 may be in pressure contact with the inner peripheral surface 14A of the outer cylinder 14. The first rubber valve 24 is set up in a tilting posture with its top 24A side situated more downstream of the first sub-orifice 26 (cf. FIGS. 5 and 14).

Figure 14:
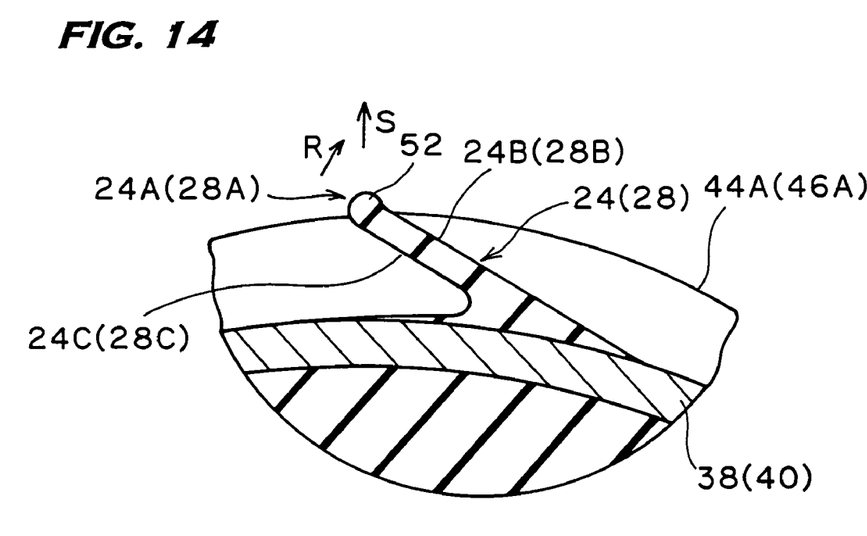
FIG. 14 is a view representing a rubber valve.

As shown in FIG. 14, the first rubber valve 24 is shaped in a rubber membrane form and a bulging portion 52 in an arc form in cross-section coming into pressure contact with the inner peripheral surface 14A of the outer cylinder 14 is formed on the top 24A over its whole width. Of a pair of membrane surfaces 24B, 24C of the first rubber valve 24, the bulging portion 52 bulges from the membrane surface 24B corresponding to upstream side of the first sub-orifice 26 toward outwardly R of the membrane surface 24B. As shown in FIG. 8, the pair of first rubber valves 24, 24 have the bulging portions 52, 52 situated in a circumferential center of the first joining wall 38. The bulging portion 52 need not always be situated in the circumferential center of the first joining wall 38, but may deviate from the center.

Figure 9:
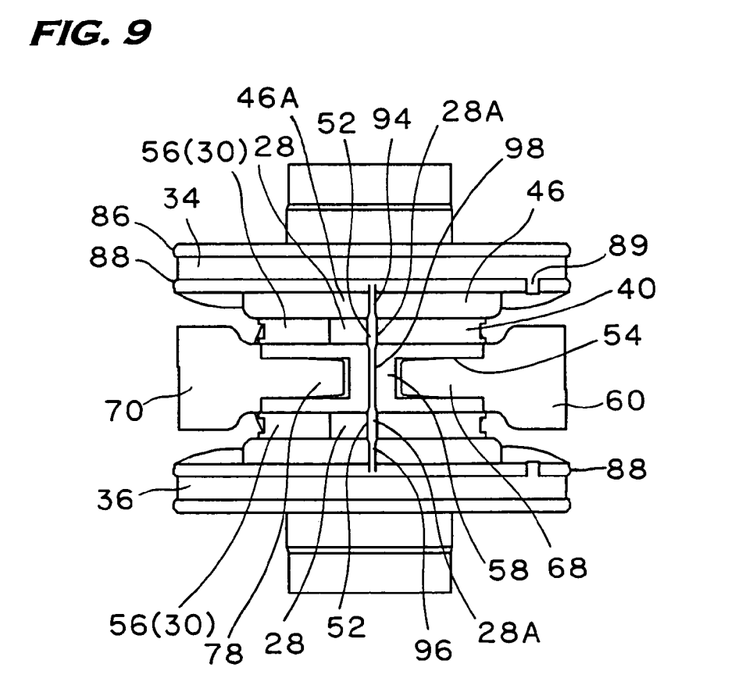
FIG. 9 is a view when the state of FIG. 8 is viewed from the rear side.

The second orifice-forming part 46 is, as shown in FIG. 9, provided with a second fitting recessed portion 54 extending in an axial central part thereof, on both axial ends of which a pair of second sub-orifice channels 56, 56 extending in the circumferential direction are formed. The second fitting recessed portion 54 and the second sub-orifice channel 56 assume a laterally U-like form in cross-section opening radially outwardly and are formed over the circumferential entirety of the second joining wall 40; Except that the second fitting recessed portion 54 is blocked off at an obstructing part 58 to be divided in the circumferential direction.

The second sub-orifice 30 is formed by bringing the inner peripheral surface 14A of the outer cylinder 14 into pressure contact with the second sub-orifice channel 56. In this embodiment, at the second orifice-forming part 46 two second sub-orifices 30, 30 are provided mutually in parallel. The second rubber valves 28, 28 are vulcanization molded in a pair of the second sub-orifice channels 56, 56 so that each top 28A of the second rubber valve 28 may be in pressure contact with the inner peripheral surface 14A of the outer cylinder 14. The second rubber valve 28 is set up in a slanting posture such that a side of the top 28A is situated more downstream of the second sub-orifice 30 (cf. FIGS. 5, 14).

The second rubber valve 28 is of the same configuration and size as the first rubber valve 24. That is, as shown in FIG. 14, the second rubber valve 28 is shaped in a membrane form, with the top 28A having the bulging portion 52. Of a pair of membrane surfaces 28B, 28C of the second rubber valve 28, the bulging portion 52 bulges from the membrane surface 28B corresponding to the upstream side of the second sub-orifice 30 toward outwardly R of the membrane surface 28B. As shown in FIG. 9, at a pair of the second rubber valves 28, 28 their bulging portions 52, 52 are situated in a circumferential center of the second joining wall 40. The bulging portion 52 need not necessarily be situated in the circumferential center of the second joining wall 40, but may depart from the center.

Figure 4:
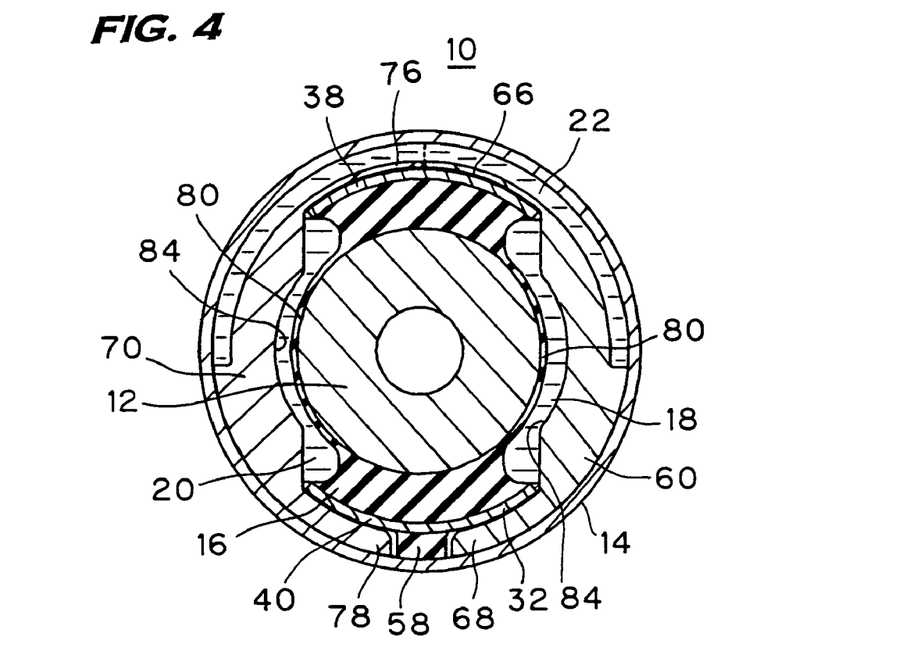
FIG. 4 is a sectional view taken along IV-IV line in FIG. 3.
Figure 10:
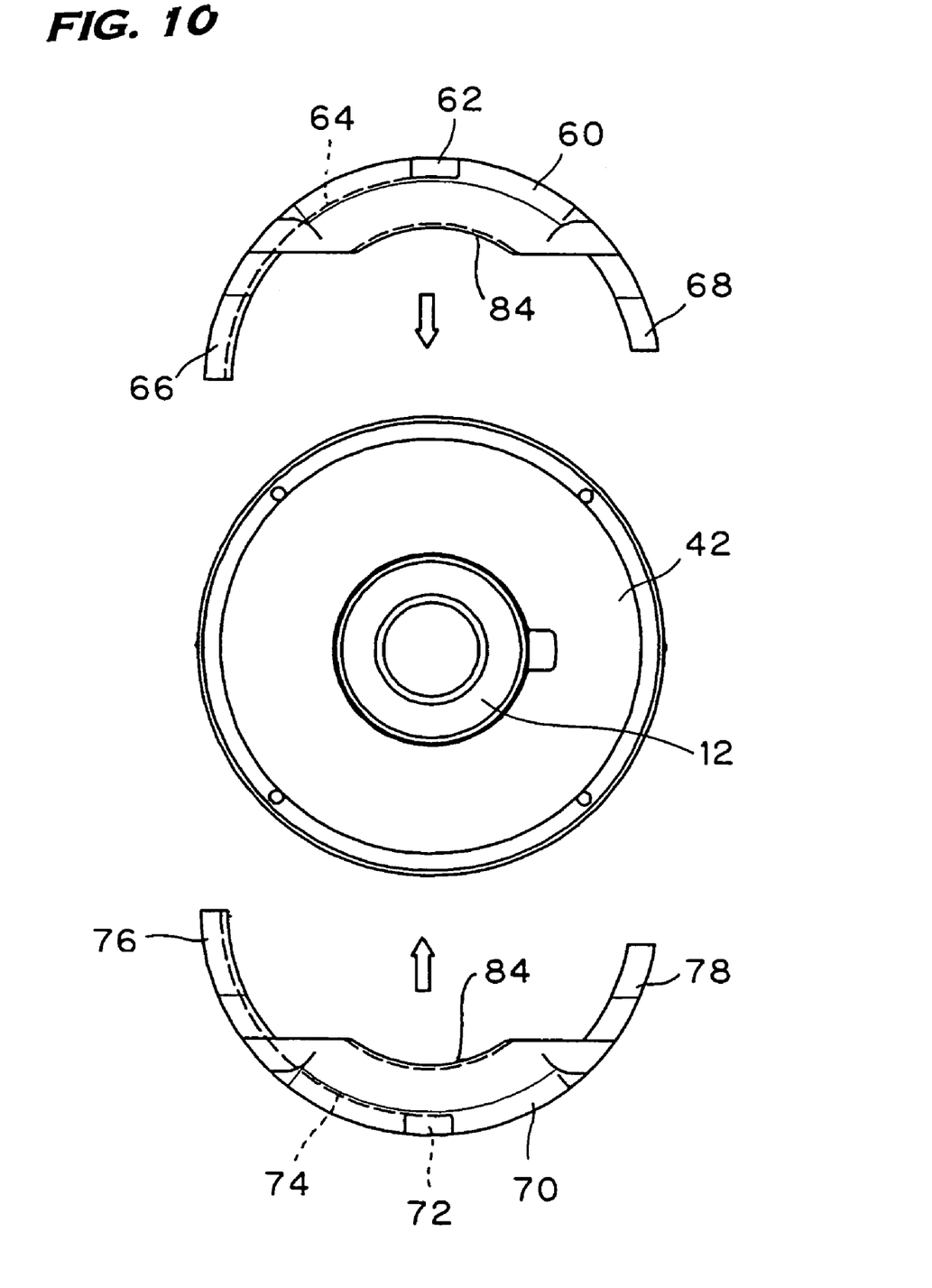
FIG. 10 is a side elevation showing the state prior to assembling of the main orifice-forming members into the rubber molding above.
Figure 13:
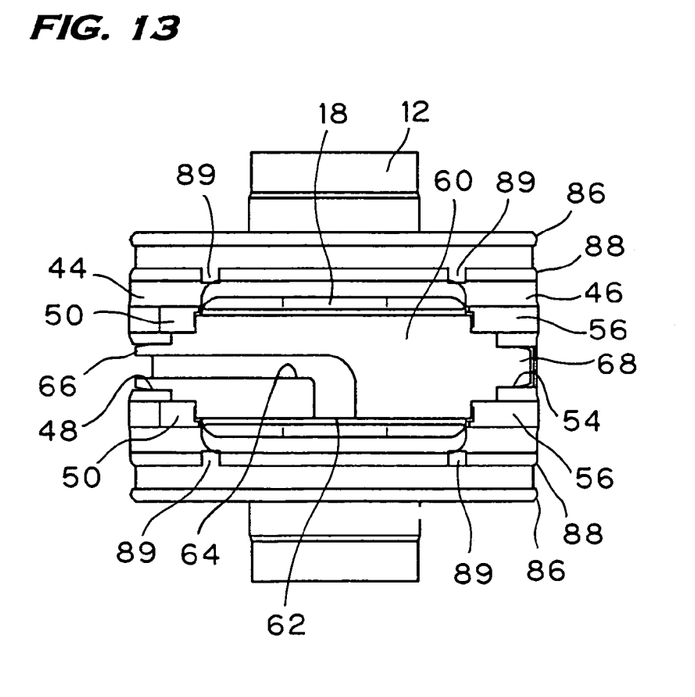
FIG. 13 is a view when the state of FIG. 12 is viewed from the rear side.

Within the first liquid chamber 18, a first main orifice-forming member 60 for formation of the main orifice 22 is disposed as illustrated in FIGS. 4 through 6. The first main orifice-forming member 60 assumes an arc shape as shown in FIGS. 10 and 13 and is provided, on its outer peripheral face, with a first main orifice channel 64 communicating with the first liquid chamber 18 through a first opening 62. At both ends of the first main orifice-forming member 60, a pair of fitting protrusions 66, 68 protruding outwardly along the circumferential direction are provided. The first main orifice channel 64 is formed to communicate from a first opening 62 in a circumferential center of the first main orifice-forming member 60 toward outwardly at the one fitting protrusion 66.

Figure 11:
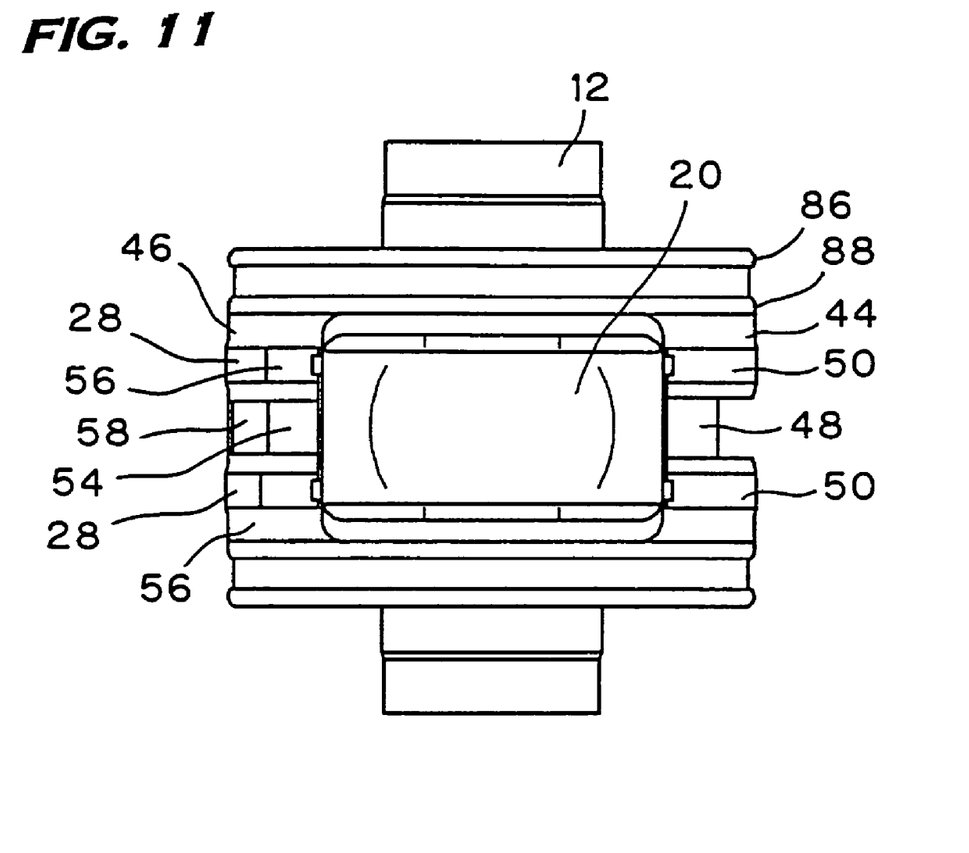
FIG. 11 is an analogous lateral elevational view to FIG. 7 showing the state prior to assembling of the main orifice forming members to the rubber molding above.
Figure 12:
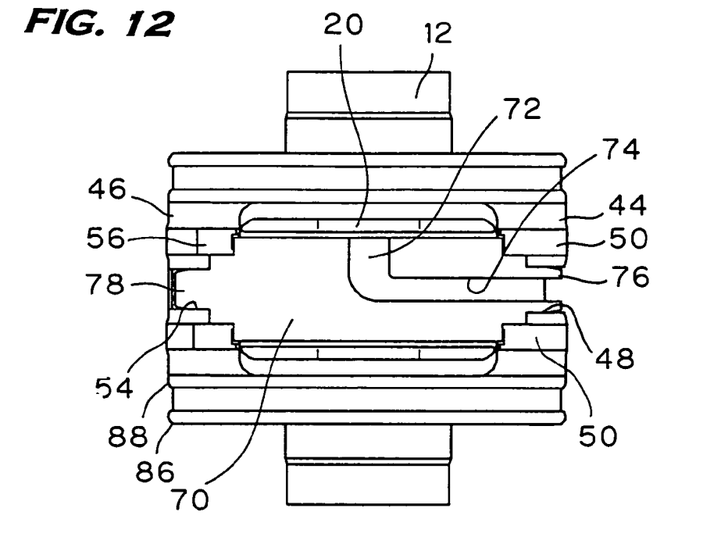
FIG. 12 is an elevational view showing the state after assembling in FIG. 11.

Likewise in the second liquid chamber 20, a similar second main orifice-forming member 70 to the first main orifice-forming member 60 assuming an arc shape is disposed. As shown in FIGS. 10, 11, 12, on the outer peripheral surface of the second main orifice-forming member 70, a second main orifice channel 74 communicating with the second liquid chamber 20 through a second opening 72 is provided, and at both ends of it, a pair of fitting protrusions 76, 78 protruding outwardly along the circumferential direction are provided. The second main orifice channel 74 is formed similarly to the first main orifice channel 64 so as to communicate from the second opening 72 toward outwardly at the one fitting protrusion 76.

As for the shape, the first main orifice channel 64 and the second main orifice channel 74 may be configured so that in order to further elongate the orifice length, for example, the circumferentially extending channels are turned back once or plural times and then communicate from the one fitting protrusions 66, 76 outwardly.

The first main orifice-forming member 60 and the second main orifice-forming member 70 are disposed in a state spanned between the first orifice-forming part 44 and the second orifice-forming part 46 on both sides in the respective liquid chambers 18, 20 by fitting the pairs of fitting protrusions 66, 68; 76, 78 into respective fitting recessed portions 48, 54.

More specifically, as illustrated in FIGS. 8, 9, and 13, the one fitting protrusion 66 of the first main orifice-forming member 60 is fitted in the first fitting recessed portion 48 of the first orifice-forming part 44 and the other fitting protrusion 68 is fitted in the second fitting recessed portion 54 of the second orifice-forming part 46. On the other hand, as shown in FIGS. 8, 9 and 12, the one fitting protrusion 76 of the second main orifice-forming member 70 is fitted in the first fitting recessed portion 48 of the first orifice-forming 44 and the other fitting protrusion 78 is fitted in the second fitting recessed portion 54 of the second orifice-forming part 46. A width W1 of the one fitting protrusions 66 and 76 and the first fitting recessed portion 48 fitting therein them is set larger than a width W2 of the other fitting protrusions 68, 78 and the second fitting recessed portion 54 fitting therein them (cf. FIG. 11). By setting the both in different widths in this way, it is possible to prevent the first and the second main orifice-forming members 60, 70 from being assembled in mutually erroneous orientation.

By the assembling in a manner described above, the first main orifice-forming member 60 and the second main orifice-forming member 70 are, at respective their outer peripheral surfaces, brought in pressure contact with the inner peripheral surface 14A of the outer cylinder 14. Further within the first fitting recessed portion 48 of the first orifice-forming part 44, the one fitting protrusion 66 of the first main orifice-forming member 60 and the one fitting protrusion 76 of the second main orifice-forming member 70 are butted to each other (cf. FIG. 8), and the first main orifice channel 64 and the second main orifice channel 74 are connected to communicate with each other. Thereby there is formed the above-mentioned main orifice 22 putting the first liquid chamber 18 and the second liquid chamber 20 in communication with each other. As for the fitting recessed portion 54 of the second orifice-forming part 46, for the reasons that the fitting protrusions 68, 78 to be inserted have no channel for the orifice formation and besides the fitting recessed portion 54 is obstructed at the obstructing part 58, the first liquid chamber 18 and the second liquid chamber 20 do not communicate at the fitting recessed portion 54.

As shown in FIGS. 4 and 6, an inner stopper 80 protruding radially outwardly from a side of the inner cylinder 12 is provided in each of the first liquid chamber 18 and the second liquid chamber 20. The inner stopper 80 is formed by covering its bulge portion provided at an axially central part of the inner cylinder 12 over its full circumference by a rubber membrane 82 extended integrally from the vibration-isolating base body 16, with its tip end face shaped in the form of a convex curved plane. Otherwise, the inner stopper 80 may be configured in a protrusion shape only on the sides of the first liquid chamber 18 and the second liquid chamber 20, instead of such a full circumferentially bulge shape.

In each of the first liquid chamber 18 and the second liquid chamber 20, an outer stopper 84 is provided radially outside of the inner stopper 80. The outer stopper 84 is provided on the first main orifice-forming member 60 and the second main orifice-forming member 70 and formed to protrude radially inwardly on the inner periphery sides of the respective members 60, 70 so as to oppose the inner stopper 80. The Up end surface of the outer stopper 84 opposing the inner stopper 80 is configured in the form of a concave curved plane having approximatey the same radius of curvature as that of the tip end surface of the inner stopper 80.

As shown in FIGS. 7 through 9, on each of the outer peripheral surfaces of the first and the second fitting peripheral walls 34, 36, a pair of annular seal lips 86 and 88 made of rubber extending circumferentially are provided at axial both ends. Of them, the outer annular seal lip 86 is provided over full circumference of each of the fitting peripheral walls. The inner annular seal lip 88 is provided in the overall circumference except for cutout portions 89 in only two places facing the first liquid chamber 18 as shown in FIGS. 12 and 13. By providing the cutout portions 89 in this way, in press fitting the outer cylinder 14 into a hole of the lower link 1, the liquid having entered between both the annular seal lips 86, 88 when the liquid is filled can be introduced into the first liquid chamber 18, thereby preventing leak of the liquid outside. Moreover due to the fact that only the side directed toward the first liquid chamber 18 is opened in this way, the fluidization of the liquid between both liquid chambers 18, 20 through the outer peripheral surfaces of the fitting peripheral walls 34, 36 can be prevented.

At the first orifice-forming part 44 as shown in FIGS. 7 and 8, a first seal lip 90 made of rubber is vulcanization molded on an outer peripheral surface 44A thereof. The first seal lip 90 joins with widthwise one end of the bulging portion 52 of the first rubber valve 24 provided in the first sub-orifice channel 50 adjacent to the first fitting peripheral wall 34 and with a lateral portion of the inner annular seal lip 88 of the first fitting peripheral wall 34. Further, such a second seal lip 92 made of rubber is provided on the outer peripheral surface 44A of the first orifice-forming part 44 that joins with widthwise one end of the bulging portion 52 of the first rubber valve 24 provided in the first sub-orifice channel 50 adjacent to the second fitting peripheral wall 36 and with a lateral portion of the inner annular seal lip 88 of the second fitting peripheral wall 36. The first seal lip 90, the bulging portions 52 of a pair of the first rubber valves 24 and the second seal lip 92 are arranged in a straight line. As depicted in FIG. 14, the bulging portion 52 of the first rubber valve 24 prior to assembling of the first orifice-forming part 44 and the outer cylinder 14 protrudes radially outwardly S of the outer peripheral surface 44A of the first orifice-forming part 44 (corresponding to the pressure contact surface of the first orifice-forming part 44 with the inner peripheral surface 14A of the outer cylinder 14). The annular seal lip 88 and the first and the second seal lips 90, 92 likewise protrude outwardly of the outer peripheral surface 44A.

At the second orifice-forming part 46 as shown in FIG. 9, a third seal lip 94 made of rubber that joins with widthwise one end of the bulging portion 52 of the second rubber valve 28 provided in the second sub-orifice channel 56 adjacent to the first fitting peripheral wall 34 and with the lateral portion of the inner annular seal lip 88 of the first fitting peripheral wall 34 is vulcanization molded on an outer peripheral surface 46A of the second orifice-forming part 46. Further, a fourth seal lip 96 made of rubber joining with widthwise one end of the bulging portion 52 of the second rubber valve 28 provided in the second sub-orifice channel 56 adjacent to the second fitting peripheral wall 36 and with the lateral portion of the inner annular seal lip 88 of the second fitting peripheral wall 36 is vulcanization molded on the outer peripheral surface 46A of the second orifice-forming part 46. Furthermore, a fifth seal lip 98 made of rubber situated between the bulging portions 52 of a pair of the second rubber valves 28 is formed on the outer peripheral surface of the obstructing portion 58. The third seal lip 94, the bulging portions 52 of the pair of the second rubber valves 28, the fourth seal lip 96, and the fifth seal lip 98 are arranged in a straight line. As shown in FIG. 14, the bulging portion 52 of the second rubber valve 28 prior to assembling of the second orifice-forming part 46 and the outer cylinder 14 protrudes radially outwardly S of the outer peripheral surface 46A of the second orifice-forming part 46. The annular seal lip 88, the third, the fourth, and the fifth seal lips 94, 96, 98 protrude likewise outwardly of the outer peripheral surface 46A.

The vibration isolation device 10 in this embodiment is fabricated as follows: A rubber molding including the inner cylinder 12, the vibration-isolating base body 16 and the intermediate cylinder 32 is vulcanization molded. While forcing the fitting peripheral walls 34, 36 of the intermediate cylinder 32 and the fitting recessed portions 48, 54 of the joining walls 38, 40 to the rubber molding thus obtained, the intermediate cylinder 32 is subjected to necking working (radius is reduced), thereby imparting a pre-compression to the vibration-isolating base body 16. Then as shown in FIG. 10, the main orifice-forming members 60, 70 are mounted, and subsequently, the outer cylinder 14 is covered within liquid and subjected to necking, and both ends of the outer cylinder 14 are curled, whereby the vibration isolation device 10 is obtained.

The vibration isolation device 10 thus obtained is installed as shown in FIG. 16 with the axial direction (center axis O) of the inner cylinder 12 oriented in the vertical direction of the vehicle, wherein the outer cylinder 14 is press fitted in a hole at a rear end of the lower link 1 and the inner cylinder 12 is joined to a vehicle body frame. Here, upon displacement in a fore-and-aft direction T of a fire 2, a load in the perpendicular direction P to the axis in the lateral direction of the vehicle is input to the vibration isolation device 10, which constitutes a main load input direction. Therefore the vibration isolation device 10 is mounted so that the first liquid chamber 18 and the second liquid chamber oppose mutually in this direction P. On the other hand, upon displacement in the vertical direction of the fire 2, a force in which the vibration isolation device 10 is about to rotate, with a line L passing through coupling parts in the front and rear of the lower link 1 centered acts, so that a load in such a prying direction Q that the center axis of the outer cylinder 14 bits relative to the center axis O of the inner cylinder 12 is input to the device (cf. FIG. 6).

In this vibration isolation device 10, when the hydraulic pressure difference between the first liquid chamber 18 and the second liquid chamber 20 is below a preset value, the first rubber valve 24 and the second rubber valve 28 remain dosed and the liquid flows through the main orifice 22, thus absorbing vibrations due to the fluidization action. When the hydraulic pressure difference of both liquid chambers 18, 20 reaches the preset value, and the hydraulic pressure of the first liquid chamber 18 becomes higher while the hydraulic pressure of the second liquid chamber 20 becomes lower, the first rubber valve 24 resiliently deforms to open, as a result of which the liquid passes through between the bulging portion 52 of the first rubber valve 24 and the inner peripheral surface 14A of the outer cylinder 14 to flow from the first liquid chamber 18 into the second liquid chamber 20. Thereby the hydraulic pressure of the first liquid chamber 18 is lowered and consequently, it is possible to prevent the inwardly curved end wall 42 from warping outwardly thereby to prevent the reduction of its durability. When the hydraulic pressure of the second liquid chamber 20 becomes higher and the hydraulic pressure of the first liquid chamber becomes lower, the second rubber valve 28 resiliently deforms to open due to the liquid pressure, and the liquid passes through between the bulging portion 52 of the second rubber valve 28 and the inner peripheral surface 14A of the outer cylinder 14 to flow from the second liquid chamber 20 to the first liquid chamber 18. Thereby the hydraulic pressure of the second liquid chamber 20 is lowered, so that the reduction in durability of the end wall 42 forming the second liquid chamber 20 can be likewise prevented.

Further according to this vibration isolation device 10, because of the first main orifice-forming member 60 and the second main orifice-forming member 70 provided within the first liquid chamber 18 and the second liquid chamber 20, it is possible to secure a sufficient orifice length for the main orifice 22, so that fluidization action thereby can be effectively exhibited.

Again because of the fact that the stopper means limiting the relative displacement of the inner and the outer cylinders 12, 14 within a predetermined range is allotted by the inner stopper 80 from the side of the inner cylinder 12 and the outer stopper 84 from each of the first and the second main orifice-forming members 60, 70, it is possible to prevent rupture of the end walls 42 upon displacement in the prying direction Q. In particular, in this embodiment, despite the end walls 42 formed to be inwardly curved, it is possible to effectively avoid the contact of the end walls 42 with the stopper means upon displacement in the prying direction Q. For the purposes of such operational effect, it is preferred to set the height (radial dimension) of the outer stopper 84 to be equal to or larger than that of the inner stopper 80.

Further because of the fact that the respective bulging portions 52 coming in pressure contact with the inner peripheral surface 14A of the outer cylinder 14 are formed to bulge outwardly R on tops of the first rubber valve 24 and the second rubber valve 28, when the hydraulic pressure difference between the first liquid chamber 18 and the second liquid chamber 20 reaches a predetermined value, an impetus is given to swaying of the first rubber valve 24 and the second rubber valve 28 toward the opening sides by the bulging portions 52, which increases the opening speeds of them. Therefore it is possible to speed up the time to reduce the hydraulic pressure difference between both liquid chambers down to a desired value.

When the first rubber valve 24 holds the dosed state, the trouble that the liquid flows widthwise outwardly of the first rubber valve 24 through the first sub-orifice 26 along its direction between the outer peripheral surface 44A of the first orifice-forming part 44 and the inner peripheral surface 14A of the outer cylinder 14 can be precluded by means of the annular seal lip 88 and the first and the second seal lips 90, 92, and the trouble that parts of the first sub-orifice channel 50 on both sides of the first rubber valve 24 stand in mutual communication can be inhibited. Likewise when the second rubber valve 28 holds the closed state, it is possible to preclude such a trouble by means of the annular seal lip 88 and the third, the fourth and the fifth seal lips 94, 96, 98 that the liquid flows widthwise outwardly of the second rubber valve 28 through the second sub-orifice 30 along its direction between the outer peripheral surface 46A of the second orifice-forming part 46 and the inner peripheral surface 14A of the outer cylinder 14, and it is possible to avoid the trouble that parts of the second sub-orifice channel 56 on both sides of the second rubber valve 28 communicate with each other.

Further where the rubber valves 24, 28 are molded in a mold device (not shown), a first mold disposed on the one membrane surface side and a second mold disposed on the other membrane surface side are demolded by removing them outwardly of the respective membrane surfaces. At that time, because the bulging portions 52 of both rubber valves 24, 28 are bulged outwardly R from the membrane surfaces 24B, 28B corresponding to the upstream sides of the sub-orifices 26, 30, upon demolding it is possible to conduct the demolding smoothly without the first mold and the second mold being partly grappled by the bulging portions 52. Besides, the bulging portions 52 of both rubber valves 24, 28 prior to assembling of the outer cylinder 14 protrude radially outwardly S of the pressure contact faces of the orifice-forming parts 44, 46 with the inner peripheral surface 14A of the outer cylinder 14, and consequently, it is possible to strengthen the pressure contact force of the bulging portions 52 against the inner peripheral surface 14A of the outer cylinder 14. As a consequence, it is possible to prevent more securely leakage of liquid from between the bulging portions 52 and the inner peripheral surface 14A of the outer cylinder 14 when the hydraulic pressure difference is below the predetermined value.

Figure 15:
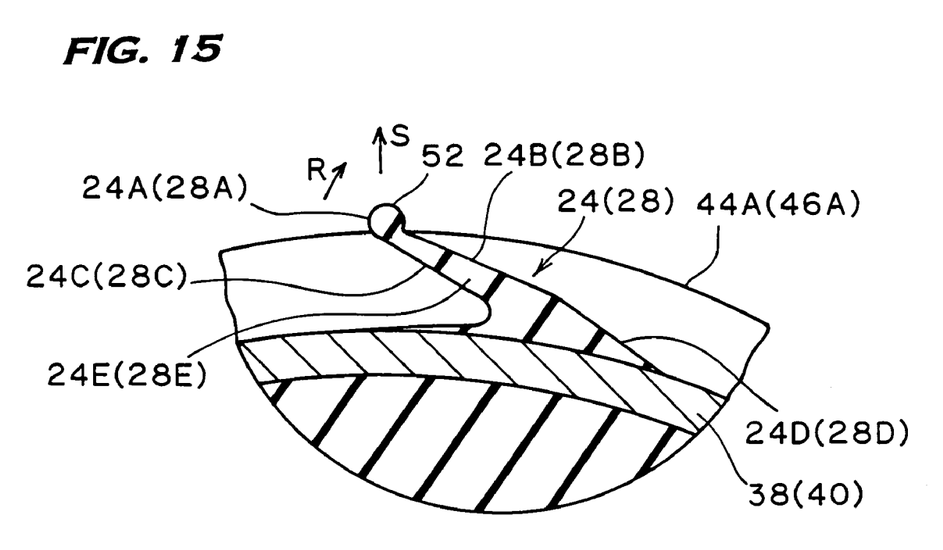
FIG. 15 is a view showing a variation example of the rubber valve.

FIG. 15 indicates a variation example of the first and the second rubber valves 24, 28. In this variant, a valve mass 24E in a rubber membrane form between the bulging portion 52 of the first rubber valve 24 and a root end portion 24D is configured in a tapered form that is thinner in wall thickness toward the bulging portion 52. On the other hand, a valve mass 28E in a rubber membrane form between the bulging portion 52 of the first rubber valve 28 and a root end portion 28D is configured in a tapered form that is thinner in wall thickness toward the bulging portion 52. Thereby it is possible to speed up the opening speed of the first and the second rubber valves 24, 28.

In the embodiment described above, the first orifice-forming part 44 is provided with two first sub-orifice channels 50, 50 and the second orifice-forming part 46 is provided with two second sub-orifice channels 56, 56, but otherwise, inversely, it is possible to provide the first orifice-forming part 44 with two second sub-orifice channels 56, 56 and the second orifice-forming part 46 with two first sub-orifice channels 50, 50. It is also possible to provide the first orifice-forming part 44 with the first and the second sub-orifice channels 50, 56 and the second orifice-forming part 46 with the first and the second sub-orifice channels 50, 56. It is still further possible to provide each of the first and the second orifice-forming parts 44, 46 with either one only, of the first sub-orifice channel 50 and the second sub-orifice channel 60.

What is claimed is:

1. A hydraulic vibration isolation device comprising: an inner cylinder;
   an outer cylinder surrounding the inner cylinder axially parallel thereto;
   a vibration-isolating base body made of rubber-like elastomer interposed between the inner cylinder and the outer cylinder;
   an intermediate cylinder disposed between the inner cylinder and the outer cylinder;
   a first liquid chamber and a second liquid chamber situated interposing the inner cylinder therebetween;
   a main orifice through which to put the first liquid chamber and the second liquid chamber into communication with each other;
   a first sub-orifice for flowing a liquid through a first rubber valve only from the first liquid chamber to second liquid chamber; and
   a second sub-orifice for flowing the liquid through a second rubber valve only from the second liquid chamber to the first liquid chamber;
   wherein said intermediate cylinder includes a pair of ring-like fitting peripheral walls at axially both ends thereof, to which the outer cylinder is fitted, and a pair of joining walls situated to interpose the inner cylinder and disposed radially inwardly of the fitting peripheral walls to interconnect the pair of fitting peripheral walls;
   said vibration-isolating base body connects inner surfaces of the pair of joining walls and an outer peripheral surface of the inner cylinder opposed to the inner surfaces thereby to delimit the first liquid chamber and the second liquid chamber in the circumferential direction;
   end walls made of rubber-like elastomer are provided between the pair of fitting peripheral walls and the inner cylinder to form chamber walls of the first liquid chamber and the second liquid chamber at axial ends thereof;
   a first orifice-forming part in pressure contact with the inner peripheral surface of the outer cylinder is provided on a side of an outer surface of at least one of the pair of joining walls, and a second orifice-forming part in pressure contact with the inner peripheral surface of the outer cylinder is provided on a side of an outer surface of the other of the pair of joining walls;
   at least one of the first orifice-forming part and the second orifice-forming part is defined with a first sub-orifice channel extending in the circumferential direction, thereby forming the first sub-orifice between the first sub-orifice channel and the inner peripheral surface of the inner cylinder;
   at least one of the first orifice-forming part and the second orifice-forming part is defined with a second sub-orifice channel extending in the circumferential direction, thereby forming the second sub-orifice between the second sub-orifice channel and the inner peripheral surface of the inner cylinder;
   the first orifice-forming part and the second orifice-forming part are provided with respective fitting recessed portions extending in the circumferential direction;
   a first main orifice-forming member having a first main orifice channel on its outer peripheral surface communicating through a first opening with the first liquid chamber is disposed within the first liquid chamber, and a second main orifice-forming member having a second main orifice channel on its outer peripheral surface communicating through a second opening with the second liquid chamber is disposed within the second liquid chamber;
   the first main orifice-forming member and the second main orifice-forming member are provided, at respective circumferentially both ends, with fitting protrusions, the fitting protrusions being fitted in the fitting recessed portions and disposed to be spanned between the first and the second orifice-forming parts within the liquid chambers;
   the first main orifice-forming member and the second main orifice-forming member are at their respective outer peripheral surfaces in pressure contact with the inner peripheral surface of the outer cylinder, and the first main orifice channel and the second main orifice channel communicate with each other and are interconnected at the first orifice-forming part, whereby to form the main orifice.

2. The hydraulic vibration isolation device as set forth in claim 1, wherein an inner stopper projecting radially outwardly from a side of the inner cylinder is provided within each of the first and the second liquid chambers, and an outer stopper projecting radially inwardly and opposing the inner stopper are provided on each of the first and the second main orifice-forming members.

3. The hydraulic vibration isolation device as set forth in claim 1, wherein the first rubber valve in the form of a rubber membrane is provided in the first sub-orifice channel so that its top may be in pressure contact with the inner peripheral surface of the outer cylinder and is formed in a slanting posture such that the top is situated downstream of the first sub-orifice;

the second rubber valve in the form of a rubber membrane is provided in the second sub-orifice channel so that its top may be in pressure contact with the inner peripheral surface of the outer cylinder and is formed in a slanting posture such that the top is situated downstream of the second sub-orifice;

the tops of the first rubber valve and the second rubber valve are formed over full width of the tops by bulging portions in an arc form in cross-section making pressure contact with the inner peripheral surface of the outer cylinder, wherein the bulging portion of the first rubber valve bulges outwardly from a membrane surface of a side corresponding to the upstream side of the first sub-orifice, of a pair of membrane surfaces of the first rubber valve, and the bulging portion of The second rubber valve bulges outwardly from a membrane surface of a side corresponding to the upstream side of the second sub-orifice.

4. The hydraulic vibration isolation device as set forth in claim 3, wherein the first orifice-forming part is provided at its axial central part with the fitting recessed portion, on at least one side of both sides of which the first sub-orifice channel is provided, and a rubber-made seal lip joining with widthwise one end of the bulging portion of the first rubber valve provided in the first sub-orifice channel and with a lateral portion of a rubber-made annular seal lip provided on the outer peripheral surface of one fining peripheral wall and extending in the circumferential direction is formed on the outer peripheral surface of the first orifice-forming part;

the second orifice-forming part is provided at its axial central part with the fitting recessed portion, on at least one side of both sides of which the second sub-orifice channel is provided, and a rubber-made seal lip joining with widthwise one end of die bulging portion of the second rubber valve provided in the second sub-orifice channel and with a lateral portion of a rubber-made annular seal lip provided on the outer peripheral surface of the fitting peripheral wall and extending in the circumferential direction is formed on the outer peripheral surface of the second orifice-forming part.

5. The hydraulic vibration isolation device as set forth in claim 3, wherein the first orifice-forming part is provided at its axially central part with the fitting recessed portion, on both sides of which the first sub-orifice channels are provided;

a rubber-made seal lip joining with widthwise one end of the bulging portion of the first rubber valve provided in the one first sub-orifice channel and with the lateral portion of the rubber-made annular seal lip provided on the outer peripheral surface of one fitting peripheral wall and extending in the circumferential direction is formed on the outer peripheral surface of the first orifice-forming part, and die rubber-made seal lip joining with widthwise one end of the bulging portion of the first rubber valve provided in the other first sub-orifice channel and with the lateral portion of the rubber-made annular seal lip provided on the outer peripheral surface of the other fitting peripheral wall and extending in the circumferential direction is formed on the outer peripheral surface of the first orifice-forming part;

the second orifice-forming part is provided at its axially central part with the fitting recessed portion, on both ends of which the second sub-orifice channels are provided;

the rubber-made seal lip joining with widthwise one end of the bulging portion of the second rubber valve provided in the one second sub-orifice channel and with the lateral portion of the rubber-made annular seal lip provided on the outer peripheral surface of the one fitting peripheral wall and extending in the circumferential direction is formed on the outer peripheral surface of the second orifice-forming part, and the rubber-made seal lip joining with widthwise one end of the bulging potion of the second rubber valve provided in the other second sub-orifice channel and with the lateral portion of the rubber-made annular seal lip provided on the outer peripheral surface of the other fitting peripheral wall and extending in the circumferential direction is formed on the outer peripheral surface of the second orifice-fonning part.

* * * * *